US011319437B2

(12) United States Patent
Tojo et al.

(10) Patent No.: US 11,319,437 B2
(45) Date of Patent: May 3, 2022

(54) THERMOPLASTIC POLYESTER RESIN COMPOSITION AND MOLDED ARTICLE

(71) Applicant: Toray Industries, Inc., Tokyo (JP)

(72) Inventors: Yusuke Tojo, Nagoya (JP); Makito Yokoe, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 13 days.

(21) Appl. No.: 16/492,784

(22) PCT Filed: Apr. 2, 2018

(86) PCT No.: PCT/JP2018/014080
§ 371 (c)(1),
(2) Date: Sep. 10, 2019

(87) PCT Pub. No.: WO2018/186339
PCT Pub. Date: Oct. 11, 2018

(65) Prior Publication Data
US 2020/0071516 A1 Mar. 5, 2020

(30) Foreign Application Priority Data
Apr. 6, 2017 (JP) ............... JP2017-075904

(51) Int. Cl.
*C08L 67/02* (2006.01)
*C08G 63/183* (2006.01)
*C08K 5/00* (2006.01)
*C08K 5/3435* (2006.01)
*C08K 7/02* (2006.01)
*C08L 63/00* (2006.01)

(52) U.S. Cl.
CPC ............ *C08L 67/02* (2013.01); *C08G 63/183* (2013.01); *C08K 5/0025* (2013.01); *C08K 5/3435* (2013.01); *C08K 7/02* (2013.01); *C08L 63/00* (2013.01); *C08L 2201/08* (2013.01); *C08L 2203/30* (2013.01); *C08L 2207/04* (2013.01)

(58) Field of Classification Search
None
See application file for complete search history.

(56) References Cited

U.S. PATENT DOCUMENTS

| 2008/0161468 A1* | 7/2008 | Juikar ............... C08F 14/18 524/423 |
| 2016/0289445 A1 | 10/2016 | Tojo et al. |
| 2019/0055398 A1 | 2/2019 | Tojo et al. |

FOREIGN PATENT DOCUMENTS

| JP | 05-17669 A | 1/1993 |
| JP | 08-48860 A | 2/1996 |
| JP | H11-21436 A | 1/1999 |
| JP | 11-228867 A | 8/1999 |
| JP | 2004-277718 A | 10/2004 |
| JP | 2006-152025 A | 6/2006 |
| JP | 2009-155478 A | 7/2009 |
| JP | 2014-196484 A | 10/2014 |
| WO | WO-2015072216 A1 * | 5/2015 ............ C08L 63/04 |

OTHER PUBLICATIONS

The European Extended Search Report dated Nov. 27, 2020, of counterpart European Application No. 18781826.5.

* cited by examiner

*Primary Examiner* — Megan McCulley
(74) *Attorney, Agent, or Firm* — DLA Piper LLP (US)

(57) ABSTRACT

A thermoplastic polyester resin composition includes 0.05 to 10 parts by weight of an epoxy compound (B) and 0.001 to 1 part by weight of a hindered amine compound (C) with respect to 100 parts by weight of a thermoplastic polyester resin (A) having an amount of carboxyl groups of 50 eq/t or less. The thermoplastic polyester resin composition is capable of producing a molded article which is excellent in mechanical properties and heat resistance, as well as in long-term hydrolysis resistance, and has a small decrease in mechanical properties and hydrolysis resistance even when melt-processed at a high temperature of 270° C. or more.

10 Claims, No Drawings

THERMOPLASTIC POLYESTER RESIN COMPOSITION AND MOLDED ARTICLE

TECHNICAL FIELD

This disclosure relates to a thermoplastic polyester resin composition and a molded article obtained by molding the same.

BACKGROUND

Thermoplastic polyester resins have been used in a wide range of fields, for example, in mechanical machine parts, electric/electronic components and automotive parts, utilizing their excellent injection moldability, mechanical properties and other features. However, the thermoplastic polyester resins are susceptible to degradation by hydrolysis. Therefore, to use the thermoplastic polyester resins as industrial materials such as materials for mechanical machine parts, electric and electronic components and automotive parts, the resins are required to have a long-term hydrolysis resistance, in addition to having balanced chemical and physical properties in general. Further, with the downsizing of molded articles in recent years, there is a growing demand for thinner and lighter molded articles. In the field of thin-walled molded article applications such as connector applications, in particular, a material having an excellent retention stability in which changes in the viscosity during melt retention is small is required because a high rate of change in the viscosity during melt retention leads to the occurrence of molding defects such as burrs and short shots during the molding.

To provide hydrolysis resistance to the thermoplastic polyester resins, a technique is known in which an epoxy resin or a hindered amine compound is added to the thermoplastic polyester resin. As such a resin composition, a thermoplastic resin composition obtained by adding a compound having three or more functional groups and two or more kinds of reactive terminal blocking agents to a thermoplastic polyester resin (JP 2009-155478 A), a polybutylene terephthalate resin composition obtained by adding a glycidyl group-containing copolymer, an ethylene. α-olefin copolymer, a fiber reinforcement, and an epoxy compound to a polybutylene terephthalate resin (JP 2014-196484 A), and a polyester resin composition obtained by adding a specific hindered amine compound (JP 8-48860 A) have been proposed.

In addition, as a resin composition containing an epoxy compound and a hindered amine compound, a resin composition obtained by adding a poly β-methylglycidyl compound and a sterically hindered amine to a carboxyl group-containing resin having an acid value of 5 to 200 mg of KOH/g (JP 11-228867 A) has been also proposed.

However, even the techniques disclosed in JP 2009-155478 A, JP 2014-196484 A and JP 8-48860 A have not been sufficient to provide a satisfactory hydrolysis resistance. Further, the disclosure in JP 11-228867 A is mainly intended to improve the weatherability of the thermosetting composition, and there has been a problem of insufficient hydrolysis resistance and retention stability.

It could therefore be helpful to provide a thermoplastic polyester resin composition capable of producing a molded article excellent in mechanical properties and heat resistance as well as in long-term hydrolysis resistance and has a small decrease in mechanical properties and hydrolysis resistance even when melt-processed at a high temperature of 270° C. or more; and the molded article.

SUMMARY

We thus provide:
[1] A thermoplastic polyester resin composition comprising 0.05 to 10 parts by weight of an epoxy compound (B) and 0.001 to 1 part by weight of a hindered amine compound (C) with respect to 100 parts by weight of a thermoplastic polyester resin (A) having an amount of carboxyl groups of 50 eq/t or less.
[2] A molded article composed of the above-mentioned thermoplastic polyester resin composition.
[3] A method of producing a molded article by melt-molding the above-mentioned thermoplastic polyester resin composition.

Therefore, the thermoplastic polyester resin composition is capable of producing a molded article excellent in mechanical properties and heat resistance, as well as in long-term hydrolysis resistance. Further, a molded article having excellent mechanical properties and a small decrease in the hydrolysis resistance even when melt-processed at a high temperature of 270° C. or more can be produced.

DETAILED DESCRIPTION

Our thermoplastic polyester resin composition will be described in detail.

The thermoplastic polyester resin composition includes 0.05 to 10 parts by weight of an epoxy compound (B) and 0.01 to 1 part by weight of a hindered amine compound (C) with respect to 100 parts by weight of a thermoplastic polyester resin (A). Although the thermoplastic polyester resin (A) has excellent injection moldability and mechanical properties, ester bonds in the thermoplastic polyester resin (A) are susceptible to breakdown by hydrolysis. As a result, the concentration of carboxyl groups will increase. As the concentration of the carboxyl groups increases, the decrease in the molecular weight of the thermoplastic polyester resin (A) is accelerated, resulting in reduced mechanical properties. However, since the epoxy compound (B) is added with the thermoplastic polyester resin (A), carboxyl groups produced by the hydrolysis of the thermoplastic polyester resin (A) react with epoxy groups of the epoxy compound (B) to prevent the increase in the concentration of the carboxyl groups. As a result, excellent mechanical properties of the thermoplastic polyester resin (A) can be maintained.

However, at a melt processing temperature as high as 270° C. or higher, the amount of the carboxyl groups increases rapidly due to the thermal decomposition of the thermoplastic polyester resin (A), and the epoxy groups of the epoxy compound (B) cannot react with all the increased carboxyl groups, resulting in a significant decrease in mechanical properties and hydrolysis resistance. In thin-walled molding, it is preferred to raise the molding processing temperature to increase the flowability, but it has been difficult to raise the molding processing temperature to 270° C. or more for the above-mentioned reason. In addition to the thermoplastic polyester resin (A) and the epoxy compound (B), the thermoplastic polyester resin composition further comprises a hindered amine compound (C). As a result, even when processing at a high temperature, the reaction of the increased carboxyl groups with the epoxy compound can be promoted. Furthermore, the molecular weight of the thermoplastic polyester resin (A) increases due to the reaction of the epoxy compound (B) and the hindered amine compound (C) that can suppress the degradation of the thermoplastic polyester resin (A). Thus, processing at a high temperature becomes possible while the hydrolysis resistance is further improved.

The thermoplastic polyester resin composition is identified by the blending materials. This is because there exists a circumstance that the identification of the structure is not practical; the thermoplastic polyester resin composition comprises a reaction product from the reaction of the component (A), the component (B) and the component (C), and this reaction product is produced by a complicated reaction.

The thermoplastic polyester resin (A) is a polymer comprising, as main structural units, at least one type of residue selected from the group consisting of (1) a dicarboxylic acid or an ester-forming derivative thereof and a diol or an ester-forming derivative thereof, (2) a hydroxycarboxylic acid or an ester-forming derivative thereof, and (3) a lactone. As used herein, the expression "comprising as major structural units" means that the resin contains at least one type of residue selected from the group consisting of the abovementioned (1) to (3) in an amount of 50% by mole or more, preferably in an amount of 80% by mole or more, with respect to the total amount of the structural units. Among these, a polymer comprising as main structural units a residue of (1) a dicarboxylic acid or an ester-forming derivative thereof and a diol or an ester-forming derivative thereof is preferred from the viewpoint of improved mechanical properties and heat resistance. Thermoplastic polyester resin (A) may be a copolymer.

Examples of the dicarboxylic acid or ester-forming derivative thereof include: aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-tetrabutylphosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid, and 1,4-cyclohexanedicarboxylic acid; and ester-forming derivatives thereof; and the like. Two or more of these compounds may be used.

Examples of the diol or ester-forming derivative thereof include: aliphatic and alicyclic glycols having from 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long chain glycols with a molecular weight of 200 to 100,000 such as polyethylene glycol, poly-1,3-propylene glycol, and polytetramethylene glycol; aromatic dioxy compounds such as 4,4'-dihydroxybiphenyl, hydroquinone, t-butylhydroquinone, bisphenol A, bisphenol S, and bisphenol F; ester-forming derivatives thereof; and the like. Two or more of these compounds may be used.

Examples of the polymer or copolymer comprising as structural units a dicarboxylic acid or an ester-forming derivative thereof and a diol or an ester-forming derivative thereof include: aromatic polyester resins such as polyethylene terephthalate, polypropylene terephthalate, polybutylene terephthalate, polypropylene isophthalate, polybutylene isophthalate, polybutylene naphthalate, polypropylene isophthalate/terephthalate, polybutylene isophthalate/terephthalate, polypropylene terephthalate/naphthalate, polybutylene terephthalate/naphthalate, polybutylene terephthalate/decanedicarboxylate, polypropylene terephthalate/5-sodium sulfoisophthalate, polybutylene terephthalate/5-sodium sulfoisophthalate, polypropylene terephthalate/polyethylene glycol, polybutylene terephthalate/polyethylene glycol, polypropylene terephthalate/polytetramethylene glycol, polybutylene terephthalate/polytetramethylene glycol, polypropylene terephthalate/isophthalate/polytetramethylene glycol, polybutylene terephthalate/isophthalate/polytetramethylene glycol, polybutylene terephthalate/succinate, polypropylene terephthalate/adipate, polybutylene terephthalate/adipate, polypropylene terephthalate/sebacate, polybutylene terephthalate/sebacate, polypropylene terephthalate/isophthalate/adipate, polybutylene terephthalate/isophthalate/succinate, polybutylene terephthalate/isophthalate/adipate, and polybutylene terephthalate/isophthalate/sebacate; and the like. As used herein, "/" represents a copolymer.

Among these, a polymer comprising as main structural units a residue of an aromatic dicarboxylic acid or an ester-forming derivative thereof and a residue of an aliphatic diol or an ester-forming derivative thereof is preferred from the viewpoint of improving mechanical properties and heat resistance. More preferred is a polymer comprising as main structural units at least one kind of residue selected from terephthalic acid, naphthalene dicarboxylic acid and an ester-forming derivative thereof, and at least one kind of residue selected from ethylene glycol, propylene glycol, 1,4-butanediol and an ester-forming derivative thereof.

Among these, particularly preferred are aromatic polyester resins such as polyethylene terephthalate, polypropylene terephthalate, polybutylene terephthalate, polypropylene naphthalate, polybutylene naphthalate, polypropylene isophthalate/terephthalate, polybutylene isophthalate/terephthalate, polypropylene terephthalate/naphthalate and polybutylene terephthalate/naphthalate. More preferred are polybutylene terephthalate, polypropylene terephthalate, and polybutylene naphthalate. Still more preferred is polybutylene terephthalate from the viewpoint of excellent moldability and crystallinity Two or more of these compounds may be used in combination with an arbitrary content.

The ratio of the amount of the residue of terephthalic acid or ester-forming derivative thereof with respect to the total amount of the dicarboxylic acid residues constituting the above-mentioned thermoplastic polyester resin (A) is preferably 30% by mole or more, and more preferably, 40% by mole or more.

As the thermoplastic polyester resin (A), a liquid crystal polyester resin capable of developing anisotropy during melting can also be used. Examples of the structural unit of the liquid crystal polyester resin include: aromatic oxycarbonyl units, aromatic dioxy units, aromatic and aliphatic dicarbonyl units, alkylenedioxy units, aromatic iminooxy units and the like.

The amount of the carboxyl groups in the thermoplastic polyester resin (A) is preferably 50 eq/t or less from the viewpoint of flowability, hydrolysis resistance and heat resistance. When the amount of the carboxyl groups exceeds 50 eq/t, the hydrolysis resistance significantly decreases because the carboxyl groups act as an acid catalyst. Furthermore, since many carboxyl groups react with the epoxy (B), the change in the molecular weight of the thermoplastic polyester resin (A) becomes large, and the retention stability is significantly deteriorated. The amount of the carboxyl groups is preferably 40 eq/t or less, more preferably 30 eq/t or less. The lower limit of the amount of the carboxyl groups is 0 eq/t. As used herein, the amount of the carboxyl groups in the thermoplastic polyester resin (A) is the amount determined by dissolving the thermoplastic polyester resin (A) in an o-cresol/chloroform solvent, and then titrating the resulting solution with ethanolic potassium hydroxide.

The thermoplastic polyester resin (A) preferably has a weight average molecular weight (Mw) of 8,000 or more from the viewpoint of further improving mechanical properties. On the other hand, the weight average molecular weight (Mw) of 500,000 or less is preferred because the flowability can be improved. The weight average molecular weight (Mw) is more preferably 300,000 or less, and still more preferably, 250,000 or less. The weight average molecular weight (Mw) of the thermoplastic polyester resin (A) is a value in terms of polymethyl methacrylate (PMMA), determined by gel permeation chromatography (GPC) using hexafluoroisopropanol as a solvent.

The thermoplastic polyester resin (A) can be produced by a known method such as polycondensation or ring-opening polymerization. The polymerization method may be either batch polymerization or continuous polymerization, and the reaction may be carried out through transesterification or direct polymerization. From the viewpoint of productivity, the continuous polymerization is preferred, and the direct polymerization is more preferably used.

When the thermoplastic polyester resin (A) is a polymer obtained by a condensation reaction of a dicarboxylic acid or an ester-forming derivative thereof and a diol or an ester-forming derivative thereof as major components, the polyester resin can be produced by subjecting the dicarboxylic acid or ester-forming derivative thereof and the diol or ester-forming derivative thereof to an esterification reaction or transesterification reaction, followed by a polycondensation reaction.

To efficiently promote the esterification reaction or transesterification reaction and the polycondensation reaction, it is preferred that a polymerization catalyst be added during the reactions. Specific examples of the polymerization catalyst include: organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, tri-isobutyltin acetate, dibutyltin diacetate, diphenyltin dilaurate, monobutyltin trichloride, dibutyltin dichloride, tributyltin chloride, dibutyltin sulfide, butylhydroxytin oxide, and alkylstannonic acids such as methylstannonic acid, ethylstannonic acid, and butylstannonic acid; zirconia compounds such as zirconium tetra-n-butoxide; and antimony compounds such as antimony trioxide and antimony acetate; and the like. Two or more of these compounds may be used.

Among the above-mentioned polymerization catalysts, organic titanium compounds and tin compounds are preferred, and tetra-n-butyl esters of titanic acid are more preferred. The polymerization catalyst is preferably added in an amount of 0.01 to 0.2 parts by weight with respect to 100 parts by weight of the thermoplastic polyester resin.

The thermoplastic polyester resin composition comprises the thermoplastic polyester resin (A) having an amount of carboxyl groups of 50 eq/t or less and the epoxy compound (B). Although the thermoplastic polyester resin tends to be susceptible to degradation by hydrolysis, as described above, the hydrolysis resistance of the polyester resin can be improved by adding thereto the epoxy compound (B).

The epoxy compound (B) is a compound having an epoxy group in the molecule and is not particularly limited. Examples thereof include glycidyl ester compounds, glycidyl ether compounds, epoxidized fatty acid ester compounds, glycidyl imide compounds, and alicyclic epoxy compounds and the like. Two or more of these compounds may be used in combination.

The glycidyl ester compound is a compound having a glycidyl ester structure. Specific examples thereof include cyclohexanecarboxylic acid glycidyl ester, stearic acid glycidyl ester, lauric acid glycidyl ester, palmitic acid glycidyl ester, versatic acid glycidyl ester, oleic acid glycidyl ester, linoleic acid glycidyl ester, linolenic acid glycidyl ester, 4-t-butylbenzoic acid glycidyl ester, p-toluic acid glycidyl ester, terephthalic acid diglycidyl ester, orthophthalic acid diglycidyl ester, polyacrylic acid glycidylate and copolymers thereof.

The glycidyl ether compound is a compound having a glycidyl ether structure, and examples thereof include condensates of a phenol compound and epichlorohydrin, novolac type epoxies, glycidyl ethers of a polyvalent hydroxyl group compound and the like.

Specific examples of the condensates of a phenol compound and epichlorohydrin include condensates obtained by the condensation of a phenol compound such as bisphenol A, resorcinol, hydroquinone, pyrocatechol, bisphenol F, saligenin, bisphenol S, 4,4'-dihydroxybiphenyl, 1,5-dihydroxynaphthalene, 1,4-dihydroanthracene-9,10-diol, 6-hydroxy-2-naphthoic acid, 1,1-methylenebis-2,7-dihydroxynaphthalene, 1,1,2,2-tetrakis-4-hydroxyphenyl ethane, and cashew phenol, and epichlorohydrin.

Specific examples of the novolac type epoxies include phenol novolac type epoxies, cresol novolac type epoxies, naphthol novolac type epoxies, bisphenol A novolac type epoxies, dicyclopentadiene-phenol added novolac type epoxies, dimethylene phenylene-phenol added novolac type epoxies, dimethylene biphenylene-phenol-added novolac type epoxies and the like.

The polyvalent hydroxyl group compound is an aliphatic compound having two or more hydroxyl groups, and specific examples thereof include glycol having 2 to 20 carbon atoms, glycerin, polyglycerin, dipentaerythritol, tripentaerythritol, xylitol, mannitol, sorbitol, galactose, maltitol, lactitol, isomalt, inositol, glucose, fructose and the like.

The epoxidized fatty acid ester compound is a compound obtained by epoxidation of the unsaturated bond of an unsaturated fatty acid ester such as soybean oil and linseed oil, and specific examples thereof include epoxidized fatty acid octyl esters, epoxidized soybean oil, epoxidized linseed oil and the like.

Specific examples of glycidyl imide compounds include N-glycidyl phthalimide, N-glycidyl-4-methyl phthalimide, N-glycidyl-4,5-dimethyl phthalimide, N-glycidyl-3-methyl phthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidyl succinimide, N-glycidyl hexahydrophthalimide, N-glycidyl-1,2,3,6-tetrahydrophthalimide, N-glycidyl maleimide, N-glycidyl-α,β-dimethylsuccinimide, N-glycidyl-α-ethylsuccinimide, N-glycidyl-α-propyl succinimide, triglycidyl isocyanurate, N-glycidyl benzamide, N-glycidyl-p-methyl benzamide, N-glycidyl naphthamide or N-glycidylsteramide and the like.

Specific examples of alicyclic epoxy compounds include 3,4-epoxycyclohexylmethyl-3,4-epoxycyclohexylcarboxylate, bis(3,4-epoxycyclohexylmethyl)adipate, vinylcyclohexene diepoxide, N-methyl-4,5-epoxycyclohexane-1,2-dicarboxylic imide, N-ethyl-4,5-epoxycyclohexane-1,2-dicarboxylic imide, N-phenyl-4,5-epoxycyclohexane-1,2-dicarboxylic imide, N-naphthyl-4,5-epoxycyclohexane-1,2-dicarboxylic imide, N-tolyl-3-methyl-4,5-epoxycyclohexane-1,2-dicarboxylic imide and the like.

The epoxy compound (B) is preferably at least one selected from a glycidyl ether compound, an epoxidized fatty acid ester compound, and an alicyclic epoxy compound because the reaction between the epoxies can be limited, and the deterioration of the retention stability can be suppressed. Among them, the glycidyl ether compound or the epoxidized fatty acid ester compound is more preferred, and the glycidyl ether compound is still more preferred because the hydrolysis resistance can be further improved. Among glycidyl ether compounds, a novolac type epoxy is preferred because the heat resistance can be improved. Further, among the novolac type epoxies, dicyclopentadiene-phenol added novolac type epoxy is particularly preferred because the retention stability can be further improved.

When the novolac type epoxy and an epoxy compound having 2 or less epoxy groups per molecule are used in combination as the epoxy compound (B), the deterioration of the retention stability at a high temperature can be suppressed, and the hydrolysis resistance can be further improved.

Examples of the epoxy compound having 2 or less epoxy groups per molecule include cyclohexanecarboxylic acid glycidyl ester, stearic acid glycidyl ester, lauric acid glycidyl ester, palmitic acid glycidyl ester, versatic acid glycidyl ester, oleic acid glycidyl ester, linoleic acid glycidyl ester, linolenic acid glycidyl ester, 4-t-butylbenzoic acid glycidyl ester, p-toluic acid glycidyl ester, terephthalic acid diglycidyl ester, orthophthalic acid diglycidyl ester; condensates obtained by the condensation of a phenol compound such as bisphenol A, resorcinol, hydroquinone, pyrocatechol, bisphenol F, saligenin, bisphenol S, 4,4'-dihydroxybiphenyl, 1,5-dihydroxynaphthalene, 1,4-dihydroanthracene-9,10-diol, 6-hydroxy-2-naphthoic acid, 1,1-methylenebis-2,7-dihydroxynaphthalene, and epichlorohydrin and the like. Among them, a condensate of bisphenol A and epichlorohydrin is preferred.

In addition, as the epoxy compound (B), an epoxy compound having an epoxy equivalent of 100 to 3000 g/eq is preferred. When the epoxy equivalent of the epoxy compound (B) is 100 g/eq or more, the amount of gas at the time of melt processing can be suppressed. The epoxy equivalent is more preferably 150 g/eq or more. Moreover, when the epoxy equivalent of the epoxy compound (B) is 3000 g/eq or less, both of the long-term hydrolysis resistance and the melt retention stability at a high temperature can be achieved at a higher level. The epoxy equivalent is more preferably 2000 g/eq or less.

The blending amount of the epoxy compound (B) is 0.05 to 10 parts by weight with respect to 100 parts by weight of the thermoplastic polyester resin (A). The long-term hydrolysis resistance is reduced when the blending amount of the component (B) is less than 0.05 parts by weight. The blending amount of the component (B) is more preferably 0.1 parts by weight or more, and still more preferably 0.3 parts by weight or more. On the other hand, when the blending amount of the component (B) is greater than 10 parts by weight, the heat resistance is reduced, and the retention stability deteriorates. The blending amount of the component (B) is more preferably 8 parts by weight or less, and still more preferably, 5 parts by weight or less.

The preferred range of the blending amount of the epoxy compound (B) can be selected depending on the epoxy equivalent of the epoxy compound (B). For example, the ratio calculated from the blending amount (the blending amount of epoxy groups (eq/g)/the blending amount of carboxyl groups (eq/g)) of the amount of the epoxy groups derived from the epoxy compound (B) included in the thermoplastic polyester resin composition to the amount of the carboxyl groups derived from the thermoplastic polyester resin (A) included in the thermoplastic polyester resin composition is preferably 0.5 to 8. When (the blending amount of epoxy groups (eq/g)/the blending amount of carboxyl groups (eq/g)) is 0.5 or more, the long-term hydrolysis resistance can be further improved. The ratio is preferably 1 or more, and more preferably, 2 or more. Further, when (the blending amount of epoxy groups (eq/g)/the blending amount of carboxyl groups (eq/g)) is 8 or less, it is possible to achieve all of the retention stability, the heat resistance, and the mechanical properties at a higher level. The ratio is preferably 7 or less, and more preferably 6 or less.

The amount of the carboxyl groups derived from the thermoplastic polyester resin (A) included in the thermoplastic polyester resin composition is calculated from the concentration of the carboxyl groups in the component (A) and from the blending ratio of the component (A) with respect to the total amount of the thermoplastic polyester resin composition. The concentration of the carboxyl groups in the thermoplastic polyester resin (A) can be calculated by: dissolving the thermoplastic polyester resin (A) in a mixed solution of o-cresol/chloroform (2/1, vol/vol) to prepare a solution; and then titrating the solution with 0.05 mol/L ethanolic potassium hydroxide, using 1% bromophenol blue as an indicator.

The thermoplastic polyester resin composition comprises the thermoplastic polyester resin (A) and furthermore the hindered amine compound (C). As described above, by including the hindered amine compound (C), processing at a high temperature becomes possible while the hydrolysis resistance is further improved. When a general amine compound is included, the self ring-opening polymerization of the epoxy compound as represented by general formula (2) due to the nucleophilicity of the amine is also promoted, which deteriorates the retention stability. On the other hand, when a hindered amine compound is included, the structure with strong steric hindrance can suppress the self ring-opening polymerization of the epoxy compound. Thus, the hindered amine compound is an excellent reaction accelerator.

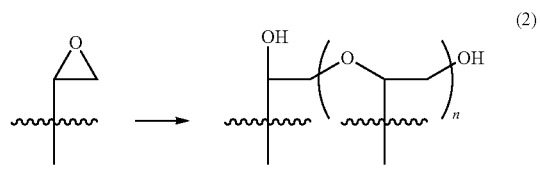

(2)

The hindered amine compound (C) is a compound containing a structure having at least one 2,2,6,6-tetramethylpiperidine derivative represented by structural formula (3) in the molecule.

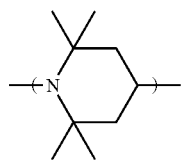

(3)

Specific examples of the hindered amine compound (C) include 4-benzoyloxy-2,2,6,6-tetramethylpiperidine, bis-(2,2,6,6-tetramethyl-4-piperidyl)adipate, bis-(2,2,6,6-tetramethyl-4-piperidyl)suberate, bis-(2,2,6,6-tetramethyl-4-piperidyl)sebacate, bis-(2,2,6,6-tetramethyl-4-piperidyl) phthalate, bis-(2,2,6,6-tetramethyl-4-piperidyl) terephthalate, bis-(1,2,2,6,6-pentamethyl-4-piperidyl) sebacate, bis-(1,2,2,6,6-pentamethyl-4-piperidyl) terephthalate, N,N'-bis-(2,2,6,6-tetramethyl-4-piperidyl) isophthalamide, N,N'-bis-(2,2,6,6-tetramethyl-4-piperidyl) adipamide, 2,2,4,4-tetramethyl-7-oxa-3,20-diazadispiro[5,1,11,2]heneicosan-21-one, bis-(1,2,2,6,6-pentamethyl-4-piperidyl)-n-butyl(3,5-di-t-butyl-4-hydroxybenzyl) malonate, bis-(2,2,6,6-tetramethyl-4-piperidyl)-n-butyl(3,5-di-t-butyl-4-hydroxybenzyl)malonate, tetra-(2,2,6,6-tetramethyl-4-piperidyl)ester of butanetetracarboxylic acid, 1-[2-[3-(3,5-di-t-butyl-4-hydroxyphenyl)propionyloxy] ethyl]-4-[3-(3,5-di-t-butyl-4-hydroxyphenyl)propionyloxy] 2,2,6,6-tetramethylpiperidine, poly[[6-(1,1,3,3-tetramethylbutyl)imino-1,3,5-triazine-2,4-diyl][(2,2,6,6-tetramethylpiperidyl)imino]hexamethylene[(2,2,6,6-tetramethyl-4-piperidyl)imino]], tetrakis(1,2,2,6,6-pentamethyl-4-piperidyl)1,2,3,4-butanetetracarboxylate, tetrakis(2,2,6,6-tetramethyl-4-piperidyl)1,2,3,4-butanetetracarboxylate, dimethyl succinate-1-(2-hydroxyethyl)-4-hydroxy-2,2,6,6-tetramethylpiperidine, condensates of 1,2,3,4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol, condensates of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)diethanol and the like.

Among the hindered amine compounds (C), NH type hindered amines with the 2,2,6,6-tetramethyl-4-piperidyl structure represented by general formula (1) is preferred because it is a secondary amine which has an active hydrogen and is strongly basic and can promote the reaction between the epoxy compound (B) and the carboxyl group.

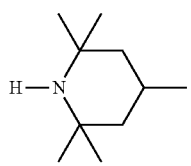

(1)

The blending amount of the hindered amine compounds (C) is 0.001 to 1 part by weight with respect to 100 parts by weight of the thermoplastic polyester resin (A). When the blending amount of the hindered amine compound (C) is less than 0.001 parts by weight, the effect of improving the hydrolysis resistance cannot be obtained. The blending amount is more preferably 0.01 parts by weight or more, and still more preferably, 0.03 parts by weight or more. On the other hand, when the blending amount of the hindered amine compound (C) exceeds 1 part by weight, the decomposition of the polyester is remarkable due to the basicity of the amine, and the retention stability tends to lower. The blending amount is more preferably 0.8 parts by weight or less, and still more preferably, 0.5 parts by weight or less.

A first factor in achieving the hydrolysis resistance, which could not be achieved with conventional techniques, is to reduce the amount of the carboxyl end groups which are originally present in the thermoplastic polyester resin (A), by adding thereto the epoxy compound (B) and the hindered amine compound (C) so that the carboxyl end groups are allowed to react with the epoxy groups of the epoxy resin compound (B). In view of this, the concentration of the carboxyl groups in the thermoplastic polyester resin composition after melt blending is preferably as low as possible. The concentration of the carboxyl groups is preferably 20 eq/t or less, particularly preferably 15 eq/t or less. The concentration of the carboxyl groups is the most preferably 0 eq/t. The concentration of the carboxyl groups in the thermoplastic polyester resin composition refers to the total concentration of the carboxyl groups derived from the thermoplastic polyester resin (A) and of the carboxyl groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B). Other components are excluded from the calculation. The total amount of the thermoplastic polyester resin (A), the epoxy compound (B) and a reaction product of the thermoplastic polyester resin (A) and the epoxy compound (B) means the total of the blending amount of the thermoplastic polyester resin (A) and the blending amount of the epoxy compound (B). The concentration of the carboxyl groups in the thermoplastic polyester resin composition can be calculated from the concentration of the carboxyl groups determined by: dissolving the thermoplastic polyester resin composition in a mixed solution of o-cresol/chloroform (2/1, vol/vol) to prepare a solution; and then titrating the solution with 0.05 mol/L ethanolic potassium hydroxide, using 1% bromophenol blue as an indicator, and from the composition of the thermoplastic polyester resin composition.

Further, a second factor in achieving the hydrolysis resistance which could not be achieved with conventional techniques is to suppress the increase in the amount of the carboxyl groups by allowing the carboxyl groups which will be produced by the hydrolysis of the thermoplastic polyester resin to react with the epoxy groups. In view of this, the concentration of the epoxy groups in the thermoplastic polyester resin composition after melt blending is preferably 5 eq/t or more. The concentration of the epoxy groups is more preferably 10 eq/t or more, and particularly preferably 20 eq/t or more. On the other hand, the concentration of the epoxy groups in the thermoplastic polyester resin composition after melt blending is preferably 150 eq/t or less because all of the long-term hydrolysis resistance, the retention stability at a high temperature and mechanical properties can be achieved at a higher level. The concentration of the epoxy groups is preferably 130 eq/t or less.

The concentration of the epoxy groups in the thermoplastic polyester resin composition refers to the total concentration of the epoxy groups derived from the epoxy compound (B) and of the epoxy groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B). Other components are excluded from the calculation. The total amount of the thermoplastic polyester resin (A), the epoxy compound (B) and a reaction product of the thermoplastic polyester resin (A) and the epoxy compound (B) means the sum of the blending amount of the thermoplastic polyester resin (A) and the blending amount of the epoxy compound (B).

The concentration of the epoxy groups in the thermoplastic polyester resin composition can be calculated from the concentration of the epoxy groups determined by: dissolving the thermoplastic polyester resin composition in a mixed solution of o-cresol/chloroform (2/1, vol/vol) to prepare a solution; adding thereto acetic acid and a solution of triethylammonium bromide in acetic acid; and subjecting the resulting solution to potentiometric titration with 0.1 mol/L perchloric acid-acetic acid, and from the composition of the thermoplastic polyester resin composition.

It is preferred that the thermoplastic polyester resin composition further include a reaction accelerator (D) that is different from the hindered amine compound (C). By including the reaction accelerator (D), the reaction between the carboxyl groups of the thermoplastic polyester resin (A) and the epoxy groups of the epoxy compound (B) can be further facilitated, thereby significantly improving the long-term hydrolysis resistance of the thermoplastic polyester resin composition.

The reaction accelerator (D) is not limited as long as it is capable of facilitating the reaction between the carboxyl groups of the thermoplastic polyester resin (A) and the epoxy groups of the epoxy compound (B). Examples of the reaction accelerator (D) that can be used include tertiary amines, amidine compounds, organic metal compounds, organic phosphines and salts thereof, imidazoles, boron compounds and the like, which are all different from the hindered amine compound (C). Two or more of these may be included. Among the reaction accelerators (D), those corresponding to the hindered amine compounds (C) as well are treated as the hindered amine compounds (C).

Examples of the tertiary amine include benzyldimethylamine, 2-(dimethylaminomethyl)phenol, 2,4,6-tris(diaminomethyl)phenol, a salt of 2,4,6-tris(diaminomethyl) phenol and tri-2-ethylhexyl acid and the like.

Examples of the amidine compound include 1,8-diazabicyclo(5,4,0)undecene-7,1,5-diazabicyclo(4,3,0)nonene-5,5, 6-dibutylamino-1,8-diazabicyclo(5,4,0)undecene-7,7-methyl-1,5,7-triazabicyclo(4,4,0)decene-5 and the like. Further, as the above amidine compound, a compound in the form of a salt with an inorganic acid or an organic acid such as 1,8-diazabicyclo(5,4,0)undecene-7-tetraphenylborate can also be used.

Examples of the organic metal compound include metal salts of stearic acid such as sodium stearate, magnesium stearate, calcium stearate, potassium stearate, and lithium stearate; chromium acetylacetonate, zinc acetylacetonate, nickel acetylacetonate, triethanolamine titanate, tin octylate and the like.

Examples of the organic phosphine and salts thereof include triparatolylphosphine, tris-4-methoxyphenylphosphine, tetrabutylphosphonium bromide, butyltriphenylphosphonium bromide, benzyltriphenylphosphonium bromide, tetraphenylphosphonium bromide, tetraphenylphosphonium tetraphenylborate, triphenylphosphine, triphenylphosphine triphenylborane, triphenylphosphine 1,4-benzoquinone adduct and the like.

Examples of the imidazole include 2-methylimidazole, 2-aminoimidazole, 2-methyl-1-vinylimidazole, 2-ethyl-4-methylimidazole, 2-heptadecylimidazole, 2-phenylimidazole, 2-undecylimidazole, 1-allylimidazole, 1-cyanoethyl-2-methylimidazole, 1-cyanoethyl-2-undecylimidazole, 1-cyanoethyl-2-undecylimidazolium trimellitate, 1-benzyl-2-methylimidazole, 1-cyanoethyl-2-ethyl-4-methylimidazole, 1-cyanoethyl-2-phenylimidazolium trimellitate, 1-dodecyl-2-methyl-3-benzylimidazolium chloride, 2-methylimidazolium isocyanurate, 2-phenylimidazolium isocyanurate, 2,4-diamino-6-[2-methylimidazolyl-(1)]ethyl-S-triazine, 1,3-dibenzyl-2-methylimidazolium chloride, 1,3-diaza-2,4-cyclopentadiene, 1-cyanoethyl-2-phenyl-4,5-di (cyanoethoxymethyl)imidazole, 2-phenyl-4,5-dihydroxymethylimidazole, 2-phenyl-4-methyl-5-hydroxymethylimidazole, 2,4-diamino-6-[2-undecylimidazolyl-(1)]ethyl-S-triazine and the like.

Examples of the boron compound include boron trifluoride-n-hexylamine, boron trifluoride-monoethylamine, boron trifluoride-benzylamine, boron trifluoride-diethylamine, boron trifluoride-piperidine, boron trifluoride-triethylamine, boron trifluoride-aniline, boron tetrafluoride-n-hexylamine, boron tetrafluoride-monoethylamine, boron tetrafluoride-benzylamine, boron tetrafluoride-diethylamine, boron tetrafluoride-piperidine, boron tetrafluoride-triethylamine, boron tetrafluoride-aniline and the like.

As the reaction accelerators (D), those containing nitrogen or phosphorus are preferred because they are able to facilitate further the reactivity between the carboxyl groups of the thermoplastic polyester resin (A) and the epoxy compound (B), thereby improving the long-term hydrolysis resistance. Amidine compounds, organic phosphines and salts thereof, imidazole and the like are more preferred, and organic phosphines and salts thereof are particularly preferred.

The blending amount of the reaction accelerator (D) is preferably 0.001 to 1 part by weight with respect to 100 parts by weight of the thermoplastic polyester resin (A). The long-term hydrolysis resistance can be further improved when the blending amount of the component (D) is 0.001 parts by weight or more. On the other hand, when the blending amount of the component (D) is 1 part by weight or less, it is possible to further improve the long-term hydrolysis resistance while maintaining the mechanical properties.

It is preferred that the thermoplastic polyester resin composition further include a fiber reinforcement (E). The fiber reinforcement (E) further improves the mechanical strength and the heat resistance.

Specific examples of the fiber reinforcement (E) include glass fibers, aramid fibers, carbon fibers and the like.

Examples of the glass fibers include chopped strand-type or robing-type glass fibers. The glass fiber treated with a silane coupling agent including an aminosilane compound and an epoxysilane compound is preferably used. In addition, the glass fiber treated with a binder containing urethane, a copolymer comprising acrylic acid such as acrylic acid/styrene copolymer, a copolymer comprising maleic anhydride such as a methyl acrylate/methyl methacrylate/ maleic anhydride copolymer, vinyl acetate, one kind or more of an epoxy compound such as bisphenol A diglycidyl ether, a novolac type epoxy compound and the like is preferably used. The glass fiber treated with a binder containing a copolymer comprising maleic anhydride is more preferred because the hydrolysis resistance can be further improved. The silane coupling agent and/or the binder may be mixed and used in an emulsion liquid.

The fiber reinforcement preferably has a fiber diameter of 1 to 30 µm. From the viewpoint of the dispersibility of the glass fiber in the resin, the lower limit of the fiber diameter is preferably 5 μm. From the viewpoint of the mechanical strength, the upper limit of the fiber diameter is preferably 15 μm. The fiber reinforcement usually has a circular cross section. However, it is possible to use a fiber reinforcement with any cross section, for example, a glass fiber with an elliptic cross section, a glass fiber with a flattened elliptic cross section, and a glass fiber with a cocoon-shaped cross section, of an arbitrary aspect ratio that allows for improving the flowability during injection molding, and for producing a molded article with less warpage.

The blending amount of the fiber reinforcement (E) is preferably 1 to 100 parts by weight with respect to 100 parts by weight of the thermoplastic polyester resin (A). The mechanical strength and the heat resistance of the resin composition can further be improved when the blending amount of the fiber reinforcement (E) is 1 part by weight or more. The blending amount is more preferably 2 parts by weight or more, and still more preferably, 3 parts by weight or more. On the other hand, when the blending amount of the fiber reinforcement (E) is 100 parts by weight or less, as well, the mechanical strength and the heat resistance of the resin composition can further be improved. The blending amount is more preferably 95 parts by weight or less, and still more preferably, 90 parts by weight or less.

The thermoplastic polyester resin composition can further include another reinforcement different from the fiber reinforcement, to the extent that the desired effect is not impaired. For example, the incorporation of the inorganic filler in the form of needles, granules, powders and layers partially improves the crystallization characteristics, arc-resistance, anisotropy, mechanical strength, flame retardancy or heat distortion temperature of the resulting molded article.

Specific examples of such a reinforcement include glass beads, milled fibers, glass flakes, potassium titanate whiskers, calcium sulfate whiskers, wollastonite, silica, kaolin, talc, calcium carbonate, zinc oxide, magnesium oxide, aluminum oxide, a mixture of magnesium oxide and aluminum oxide, silicic acid fine powder, aluminum silicate, silicon oxide, smectite clay minerals (montmorillonite, hectorite, etc.) vermiculite, mica, fluorine taeniolite, zirconium phosphate, titanium phosphate, dolomite and the like. Two or more of these may be included. The use of a reinforcement selected from milled fibers, glass flakes, kaolin, talc and mica provides a molded article with less warpage because they are effective in reducing anisotropy. Further, when a reinforcement selected from calcium carbonate, zinc oxide, magnesium oxide, aluminum oxide, a mixture of magnesium oxide and aluminum oxide, silicic acid fine powder, aluminum silicate and silicon oxide is included in an amount of 0.01 to 1 part by weight with respect to 100 parts by weight of the thermoplastic polyester resin (A), the retention stability can further be improved.

The reinforcement other than the above-mentioned fiber reinforcement may be surface treated with a coupling agent, an epoxy compound, or by ionization. The inorganic filler in the form of granules, powders and layers preferably has an average particle size of 0.1 to 20 μm from the viewpoint of improving the impact strength. The average particle size is preferably 0.2 μm or more from the viewpoint of the dispersibility of the inorganic filler in the resin, and is preferably 10 μm or less from the viewpoint of the mechanical strength.

The total of the blending amount of the inorganic filler other than the fiber reinforcement and the blending amount of the fiber reinforcement is preferably 100 parts by weight or less with respect to 100 parts by weight of the thermoplastic polyester resin (A), from the viewpoint of improving the flowability during molding and the durability of the molding machine and mold. The blending amount of the inorganic filler other than the fiber reinforcement is preferably 1 to 50 parts by weight with respect to 100 parts by weight of the thermoplastic polyester resin (A). When the blending amount of the inorganic filler other than the fiber reinforcement is 1 part by weight or more, it is possible to reduce the anisotropy and to further improve the retention stability. The blending amount is more preferably 2 parts by weight or more, and still more preferably, 3 parts by weight or more. On the other hand, the mechanical strength can be improved when the blending amount of the inorganic filler other than the fiber reinforcement is 50 parts by weight or less.

The resin composition may include one or more any additives such as an ultraviolet absorber, a photostabilizer, a plasticizer and an antistatic agent, to the extent that the desired effect is not impaired.

The resin composition may include a phosphorus-based stabilizer to the extent that the desired effect is not impaired. Incorporation of the phosphorus-based stabilizer can suppress the crosslinking reaction between epoxy compounds (B) and can further improve the retention stability at a high temperature of 270° C. or more.

The phosphorus-based stabilizer is a compound containing a structure represented by structural formula (4), that is, a structure in which two or more oxygen atoms are bound to a phosphorus atom with a lone pair. When the above-mentioned structure is contained, the structure is coordinated to the phenoxy radicals and/or quinones, which are derived from the novolac type epoxy resin and are the cause of the coloration, thereby allowing for the decomposition of the phenoxy radicals and/or quinones, or the prevention of the coloration. In a common phosphorus compound, the upper limit of the number of oxygen atoms capable of binding to a phosphorus atom with a lone pair is 3, based on the valency of a phosphorus atom, which is 5.

(4)

Regarding the examples of the phosphorus-based stabilizer, specifically, examples of the compound containing a structure in which two oxygen atoms are bound to a phosphorus atom with a lone pair include phosphonite compounds; and examples of the compound containing a structure in which three oxygen atoms are bound to a phosphorus atom with a lone pair include phosphite compounds.

The phosphonite compound may be, for example, a condensate of a phosphonous acid compound such as phenylphosphonous acid or 4,4'-biphenylene diphosphonous acid and an aliphatic alcohol having 4 to 25 carbon atoms and/or a phenol compound such as 2,6-di-t-butylphenol or 2,4-di-t-butyl-5-methylphenol. Specific examples thereof include: bis(2,4-di-t-butyl-5-methylphenyl)-phenylphosphonite, tetrakis(2,4-di-t-butyl-5-methylphenyl)-4,4'-biphenylene diphosphonite, tetrakis(2,4-di-t-butylphenyl)-4,4'-biphenylene diphosphonate and the like.

Among these, tetrakis(2,4-di-t-butyl-5-methylphenyl)-4, 4'-biphenylene diphosphonite and tetrakis(2,4-di-t- butylphenyl)-4,4'-biphenylene diphosphonite are preferred, from the viewpoint of the thermal stability of the phosphorus-based stabilizer.

The phosphite compound may be, for example, a condensation product of a phosphorous acid, an aliphatic alcohol having 4 to 25 carbon atoms, a polyol such as glycerol or pentaerythritol, and/or a phenol compound such as 2,6-di-t-butylphenol or 2,4-di-t-butylphenol. Specific examples thereof include: tris(alkylaryl) phosphites (however, the alkyl group in this example is a branched alkyl group having 3 to 6 carbon atoms) such as triisodecyl phosphite, trisnonylphenyl phosphite, diphenyl isodecyl phosphite, phenyl diisodecyl phosphite, 2,2-methylenebis(4,6-di-t-butylphenyl)octyl phosphite, 4,4'-butylidenebis(3-methyl-6-t-butylphenyl)ditridecyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris[2-(1,1-dimethylpropyl)-phenyl]phosphite, and tris[2,4-(1,1-dimethylpropyl)-phenyl]phosphite; bis(alkylaryl) pentaerythritol diphosphites (however, the alkyl group in this example is an alkyl group having 3 to 9 carbon atoms) such as bis(2-t-butylphenyl)phenyl phosphite, tris(2-cyclohexylphenyl) phosphite, tris(2-t-butyl-4-phenyl) phosphite, bis(octyl)pentaerythritol diphosphite, bis(octadecyl)pentaerythritol diphosphite, bis(2,4-di-t-butyl-4-methylphenyl) pentaerythritol diphosphite, bis(2,6-di-t-butyl-4-methylphenyl)pentaerythritol diphosphite, bis(nonylphenyl) pentaerythritol diphosphite, and bis(nonylphenyl) pentaerythritol diphosphite; and the like. Two or more of these compounds may be used.

Among these, bis(alkylaryl)pentaerythritol diphosphite is preferred; and bis(2,4-di-t-butyl-4-methylphenyl)pentaerythritol diphosphite and bis(2,6-di-t-butyl-4-methylphenyl)pentaerythritol diphosphite are more preferred, from the viewpoint of the thermal stability of the phosphorus-based stabilizer.

The blending amount of the phosphorus-based stabilizer to be included in the resin composition can be adjusted depending on the type and the blending amount of the epoxy compound (B). However, the blending amount of the phosphorus-based stabilizer is preferably 0.01 to 1 part by weight with respect to 100 parts by weight of the thermoplastic polyester resin (A). The color of the resulting molded article can be improved when the blending amount of the phosphorus-based stabilizer is 0.01 parts by weight or more. The blending amount is more preferably 0.05 parts by weight or more. When the blending amount of the phosphorus-based stabilizer is 1 part by weight or less, on the other hand, the long-term hydrolysis resistance and the mechanical properties can further be improved. The blending amount is more preferably 0.5 parts by weight or less.

The resin composition may also include a thermoplastic resin other than the component (A), to the extent that the desired effect is not impaired to improve the moldability, dimensional accuracy, mold shrinkage and toughness of the resin composition and the resulting molded article. Examples of the thermoplastic resin other than the component (A) include: olefin resins, vinyl resins, polyamide resins, polyacetal resins, polyurethane resins, aromatic polyketone resins, aliphatic polyketone resins, polyphenylene sulfide resins, polyether ether ketone resins, polyimide resins, thermoplastic starch resins, polyurethane resins, aromatic polycarbonate resins, polyarylate resins, polysulfone resins, polyethersulfone resins, phenoxy resins, polyphenylene ether resins, poly-4-methylpentene-1, polyetherimide resins, cellulose acetate resins, polyvinyl alcohol resins and the like. Specific examples of the olefin resin include ethylene/propylene copolymers, ethylene/propylene/non-conjugated diene copolymers, ethylene-butene-1 copolymers, ethylene/glycidyl methacrylate copolymers, ethylene/butene-1/maleic anhydride copolymers, ethylene/propylene/maleic anhydride copolymers, ethylene/maleic anhydride copolymers and the like. Specific examples of the vinyl resin include: vinyl (co)polymers such as methyl methacrylate/styrene resins (MS resin), methyl methacrylate/acrylonitrile resins, polystyrene resins, acrylonitrile/styrene resins (AS resins), styrene/butadiene resins, styrene/N-phenylmaleimide resins, and styrene/acrylonitrile/N-phenylmaleimide resins; styrene-based resins modified with a rubbery polymer such as acrylonitrile/butadiene/styrene resins (ABS resins), acrylonitrile/butadiene/methyl methacrylate/styrene resins (MABS resins), and high impact polystyrene resins; block copolymers such as styrene/butadiene/styrene resins, styrene/isoprene/styrene resins, and styrene/ethylene/butadiene/styrene resins; core-shell rubber such as a multilayer structure of dimethylsiloxane/butyl acrylate copolymer (core layer) and a methyl methacrylate polymer (shell layer), a multilayer structure of dimethylsiloxane/butyl acrylate copolymer (core layer) and acrylonitrile/styrene copolymer (shell layer), a multilayer structure of a butanediene/styrene copolymer (core layer) and a methyl methacrylate polymer (shell layer), a multilayer structure of a butanediene/styrene copolymer (core layer) and a acrylonitrile/styrene copolymer (shell layer) and the like.

Among them, from the viewpoint of improving the toughness and the hydrolysis resistance of the resin composition, it is preferred to add an olefin resin having high hydrolysis resistance.

The blending amount of the olefin resin is preferably 0.1 to 30 parts by weight with respect to 100 parts by weight of the thermoplastic polyester resin (A). The toughness and the hydrolysis resistance are further improved when the blending amount is 0.1 parts by weight or more. The blending amount is more preferably 0.5 parts by weight or more, and still more preferably, 1 part by weight or more. On the other hand, the mechanical properties are further improved when the blending amount is 30 parts by weight or less. The blending amount is more preferably 20 parts by weight or less, and still more preferably, 10 parts by weight or less.

The resin composition can further include a polyol compound having three or four functional groups and containing one or more alkylene oxide units (hereinafter described as "polyol compound" in some instances). Incorporation of such a compound serves to improve the flowability during molding such as injection molding. The polyol compound may be a low molecular weight compound or a polymer. Examples of the functional group include hydroxyl groups, aldehyde groups, carboxylic acid groups, sulfo groups, amino groups, isocyanate groups, carbodiimide groups, oxazoline groups, oxazine groups, ester groups, amide groups, silanol groups, silyl ether groups and the like. Among them, three or four functional groups which are the same or different from each other are preferably contained. It is still more preferred that the three or four functional groups contained be the same, particularly from the viewpoint of improving the flowability, mechanical properties, durability, heat resistance and productivity.

Preferred examples of the alkylene oxide unit include aliphatic alkylene oxide units each having 1 to 4 carbon atoms. Specific examples thereof include methylene oxide unit, ethylene oxide unit, trimethylene oxide unit, propylene oxide unit, tetramethylene oxide unit, 1,2-butylene oxide unit, 2,3-butylene oxide unit, isobutylene oxide unit and the like.

It is preferred that a compound containing an ethylene oxide unit or a propylene oxide unit as the alkylene oxide unit be used, from the viewpoint of improving the flowability, recycling properties, durability, heat resistance and mechanical properties. Further, it is particularly preferred that a compound containing a propylene oxide unit be used, from the viewpoint of improving the long-term hydrolysis resistance and toughness (tensile elongation at break). The number of the alkylene oxide unit per one functional group is preferably 0.1 or more, more preferably, 0.5 or more, and still more preferably, 1 or more, from the viewpoint of improving the flowability. On the other hand, from the viewpoint of improving the mechanical properties, the number of the alkylene oxide unit per one functional group is preferably 20 or less, more preferably, 10 or less, and still more preferably, 5 or less.

In addition, the polyol compound may be reacted with the thermoplastic polyester resin (A) to be introduced into the main chain and/or side chains of the component (A), or alternatively, the polyol compound may retain, in the resin composition, its original structure before it was added to the resin composition, without reacting with the component (A).

The blending amount of the polyol compound is preferably 0.01 to 3 parts by weight with respect to 100 parts by weight of the thermoplastic polyester resin (A). The blending amount is more preferably 0.1 parts by weight or more from the viewpoint of the flowability, and more preferably, 1.5 parts by weight or less from the viewpoint of the mechanical strength.

The thermoplastic polyester resin composition can include a flame retardant, to the extent that the desired effect is not impaired. Examples of the flame retardant include phosphorus-based flame retardants, halogen-based flame retardants such as bromine-based flame retardants, salts of a triazine compound and cyanuric acid or isocyanuric acid, silicone-based flame retardants, inorganic flame retardants and the like. Two or more of these may be included.

The blending amount of the flame retardant is preferably 1 to 50 parts by weight with respect to 100 parts by weight of the thermoplastic polyester resin (A). The blending amount is more preferably 5 parts by weight or more from the viewpoint of the flame retardancy, and more preferably 40 parts by weight or less in terms of the heat resistance.

A mold release agent can be blended to improve the releasability from the mold during melt processing. Examples of the mold release agent include higher fatty acid ester waxes such as montanic acid and stearic acid, polyolefin waxes, ethylene bis stearoamide waxes and the like.

The blending amount of the mold release agent is preferably 0.01 to 1 part by weight with respect to 100 parts by weight of the thermoplastic polyester resin (A). The blending amount is more preferably 0.03 parts by weight or more from the viewpoint of the releasability, and preferably 0.6 parts by weight or less in terms of the heat resistance.

The resin composition can further include one or more of carbon black, titanium oxide and various types of color pigments and dyes. By including such a pigment or dye, it is possible to adjust the color of the resin composition and the resulting molded article to various types of colors, and to improve the weatherability (light resistance) and electrical conductivity thereof. Examples of the carbon black include channel black, furnace black, acetylene black, anthracene black, lamp black, soot of burnt pine, graphite and the like. The carbon black to be used preferably has an average particle size of 500 nm or less, and a dibutyl phthalate absorption of 50 to 400 cm3/100 g. As the titanium oxide, one having a rutile-type or anatase-type crystalline structure, and an average particle size of 5 µm or less is preferably used.

These carbon black, titanium oxide and various types of color pigments and dyes may be surface treated with aluminum oxide, silicon oxide, zinc oxide, zirconium oxide, a polyol, a silane coupling agent or the like. Further, these carbon black, titanium oxide and various types of color pigments and dyes may be used in the form of a mixture material with various types of thermoplastic resins, obtained by melt blending, or by simply blending these components to improve dispersibility of such pigments and dyes in the resin composition, and handleability during the production process.

The blending amount of the pigment or dye is preferably 0.01 to 3 parts by weight with respect to 100 parts by weight of the thermoplastic polyester resin (A). The blending amount is more preferably 0.03 parts by weight or more from the viewpoint of the prevention of uneven coloration, and preferably 1 part by weight or less from the viewpoint of the mechanical strength.

The thermoplastic polyester resin composition can be obtained, for example, by melt blending the components (A) to (C), and other components, as required.

Examples of the method of melt blending include: a method in which the thermoplastic polyester resin (A), the epoxy compound (B), the hindered amine compound (C) as well as the reaction accelerator (D) and various types of additives as required are premixed, and the resulting mixture is then fed to a melt blending machine to be melt blended; a method in which a specified amount of each of the components is fed to a melt blending machine, using a metering feeder such as a weight feeder, to be melt blended; and the like. As the melt blending machine, for example, a single-screw extruder, a twin-screw extruder, a triple-screw extruder, a conical extruder or a kneader-type mixer, equipped with "Uni-melt" or "Dulmage" type screw can be used.

The premixing can be carried out, for example, by dry blending; or utilizing a mechanical mixing apparatus such as a tumble mixer, a ribbon mixer or a Henschel mixer. When a multi-screw extruder such as a twin-screw extruder is used for melt blending, the fiber reinforcement (E) and the inorganic filler other than the fiber reinforcement may be fed through a side feeder installed between the feeding portion and the vent portion. When a liquid additive is used, the additive may be fed, for example, through a liquid feeding nozzle installed between the feeding portion and the vent portion of a multi-screw extruder such as a twin-screw extruder, using a plunger pump; or through the feeding portion or the like, using a metering pump.

It is preferred that the thermoplastic polyester resin composition be formed into pellets, and then the pellets be subjected to molding processing. The formation of pellets can be carried out, for example, by melt blending the thermoplastic polyester resin composition using a melt blending machine or the like, discharging the melt blended thermoplastic polyester resin composition in the form of strands, and then cutting the resulting strands with a strand cutter.

By melt-molding the thermoplastic polyester resin composition, it is possible to obtain a molded article in the form of a film, fiber, and other various types of shapes. Examples of the melt-molding method include methods such as injection molding, extrusion molding, blow molding and the like. The injection molding is particularly preferably used.

In addition to a regular injection molding method, other types of injection molding methods are also known such as gas assisted molding, two-color molding, sandwich molding, in-mold molding, insert molding, injection press molding and the like, and the resin composition can be prepared using any of the methods.

Further, the thermoplastic polyester resin composition has an excellent property that the decrease in mechanical properties and hydrolysis resistance is small even when melt-molding is performed at a high temperature of 270° C. to 300° C. The molding at a high temperature can improve further the flowability of the resin composition, which can be thus processed into a thinner and more precise molded article.

The molded article can be suitably used for molded articles selected from mechanical machine parts, electric components, electronic components and automotive parts, utilizing its excellent mechanical properties such as long-term hydrolysis resistance, tensile strength and elongation, and excellent heat resistance. Further, the molded article is useful particularly as exterior components, because of its excellent long-term hydrolysis resistance.

Specific examples of the mechanical machine parts, electric components, electronic component and automotive parts include: breakers, electromagnetic switches, focus cases, flyback transformers, molded articles for fusers of copying machines and printers, general household electrical appliances, housings of office automation equipment, parts of variable capacitor case, various types of terminal boards, transformers, printed wiring boards, housings, terminal blocks, coil bobbins, connectors, relays, disk drive chassis, transformers, switch parts, wall outlet parts, motor components, sockets, plugs, capacitors, various types of casings, resistors, electric and electronic components into which metal terminals and conducting wires are incorporated, computer-related components, audio components such as acoustic components, parts of lighting equipment, telegraphic communication equipment-related components, telephone equipment-related components, components of air conditioners, components of consumer electronics such as VTR and television set, copying machine parts, facsimile machine parts, components of optical devices, components of automotive ignition system, connectors for automobiles, various types of automotive electrical components and the like.

EXAMPLES

The thermoplastic polyester resin composition will now be described specifically, by way of Examples. Raw materials to be used in the Examples and Comparative Examples will be shown below. All "%" and "part(s)" as used herein represent "% by weight" and "part(s) by weight", respectively, and "/" used in the names of the resins below indicates that the resin is a copolymer.

Thermoplastic Polyester Resin (A)
<A-1> Polybutylene terephthalate resin: a polybutylene terephthalate resin having an amount of carboxyl groups of 30 eq/t (acid value of 1.7 mg of KOH/g), manufactured by Toray Industries, Inc.
<A-2> Polyethylene terephthalate resin: a polyethylene terephthalate resin having an amount of carboxyl groups of 40 eq/t (acid value of 2.2 mg of KOH/g), manufactured by Toray Industries, Inc.
<A'-3> Saturated polyester resin: "U-Pica Coat" (registered trademark) GV130 having an amount of carboxyl groups of 55 eq/t (acid value of 3.1 mg of KOH/g), manufactured by Japan U-Pica Company Ltd.

Epoxy Compound (B)
<B-1> Diglycidyl terephthalate with an epoxy equivalent of 147 g/eq: "Denacol" (registered trademark) EX711 manufactured by Nagase ChemteX Corporation
<B-2> Condensate of bisphenol A and epichlorohydrin with an epoxy equivalent of 190 g/eq: "jER (registered trademark) 819" manufactured by Mitsubishi Chemical Corporation.
<B-3> Cresol novolac type epoxy with an epoxy equivalent of 211 g/eq: "EOCN-102S" manufactured by Nippon Kayaku Co., Ltd.
<B-4> Dicyclopentadiene-phenol added novolac type epoxy with an epoxy equivalent of 253 g/eq: "XD-1000" manufactured by Nippon Kayaku Co., Ltd.
<B-5> Dimethylene biphenylene-phenol added novolac type epoxy with an epoxy equivalent of 290 g/eq: "NC-3000H" manufactured by Nippon Kayaku Co., Ltd.
<B-6> Epoxidized soybean oil with an epoxy equivalent of 232 g/eq: "ADK CIZER" (registered trademark) O-130P manufactured by ADEKA Corporation
<B-7> Triglycidyl isocyanurate with an epoxy equivalent of 109 g/eq: "TEPIC (registered trademark)-S" manufactured by Nissan Chemical Industries, Ltd.
<B-8> 3,4-Epoxycyclohexylmethyl-3,4-epoxycyclohexyl-carboxylate with an epoxy equivalent of 135 g/eq: "Celloxide" (registered trademark) 2021P manufactured by Daicel Corporation.

Hindered Amine Compound (C)
<C-1> Tetrakis(1,2,2,6,6-pentamethyl-4-piperidyl)1,2,3,4-butanetetracarboxylate: "Adekastab" (registered trademark) LA52 manufactured by ADEKA Corporation
<C-2> Bis-(2,2,6,6-tetramethyl-4-piperidyl)terephthalate: "Adekastab" (registered trademark) LA57 manufactured by ADEKA Corporation
<C-3> N,N'-bis-(2,2,6,6-tetramethyl-4-piperidyl)isophthalamide: "Nylostab S-EED" (registered trademark) manufactured by Clariant International Ltd.
<C-4> Bis-(2,2,6,6-tetramethyl-4-piperidyl)sebacate: "KEMISTAB" (registered trademark) 77 manufactured by Chemipro Kasei Kaisha, Ltd.

Reaction Accelerator (D)
<D-1> Amidine compound: 1,8-diazabicyclo (5,4,0)undecene-7, "DBU" (registered trademark), with a molecular weight of 152.2, manufactured by San-Apro Ltd.
<D-2> Imidazole: 2-ethyl-4-methylimidazole, "2E4MZ", with a molecular weight of 110.2, manufactured by Shikoku Chemicals Corporation.
<D-3> Organic phosphine and salt thereof: tetraphenylphosphonium bromide, tetraphenylphosphonium bromide (reagent) with a molecular weight of 419.3, manufactured by Tokyo Chemical Industry Co., Ltd.

Fiber Reinforcement (E)
<E-1> Glass fiber treated with a binder containing an epoxy compound: Glass fiber ECS03T-187 manufactured by Nippon Electric Glass Co., Ltd., with a diameter of the cross section of 13 μm, and a fiber length of 3 mm
<E-2> Glass fiber treated with a binder containing a copolymer comprising maleic anhydride: ECSO3T-253 manufactured by Nippon Electric Glass Co., Ltd., the diameter of the cross section 13 μm, and the fiber length 3 mm.

Other Additives (F)

<F-1> Bis(2,6-di-t-butyl-4-methylphenyl)pentaerythritol diphosphite: "Adekastab" (registered trademark) PEP36, manufactured by ADEKA Corporation.

Methods for Measuring Properties

In each Example and Comparative Example, the properties were evaluated according to the following measurement methods.

1. Blending Amount of Carboxyl Groups Derived from Component (A) in Thermoplastic Polyester Resin Composition A solution obtained by dissolving the thermoplastic polyester resin (A) in a mixed solution of o-cresol/chloroform (2/1, vol/vol) was titrated with 0.05 mol/L ethanolic potassium hydroxide, using 1% bromophenol blue as an indicator, and the concentration of the carboxyl groups calculated by the following equation. Blue (color D55-80 (2007 version, D-Pocket Type, published by Japan Paint Manufacturers Association)) was used as the end point of the titration.

The concentration of the carboxyl groups [eq/g]={(the amount of 0.05 mol/L ethanolic potassium hydroxide [ml] required for the titration of the mixed solution of o-cresol/chloroform (2/1, vol/vol) in which the component (A) is dissolved−the amount of 0.05 mol/L ethanolic potassium hydroxide [ml] required for the titration of the mixed solution of o-cresol/chloroform (2/1, vol/vol) in which the component (A) is not included)×the concentration of 0.05 mol/L ethanolic potassium hydroxide [mol/ml]×1}/the amount of the component (A) [g] used in the titration.

The blending amount of the carboxyl groups derived from the (A) in the thermoplastic polyester resin composition was calculated according to the following equation, from the concentration of the carboxyl groups in the component (A) calculated based on the result of the above-mentioned titration, and from the blending amount of the component (A) in the thermoplastic polyester resin composition.

The blending amount [eq/g] of the carboxyl group of the (A) in the thermoplastic polyester resin composition=(the concentration [eq/g] of the carboxyl groups in the component (A)×the blending amount [parts by weight]) of the component (A)/the total amount of the thermoplastic polyester resin composition [parts by weight].

2. Blending Amount of Epoxy Groups Derived from Component (B)

In accordance with JIS K7236: 2001, to a solution obtained by dissolving the epoxy compound (B) in chloroform, acetic acid and a solution of triethylammonium bromide in acetic acid were added, and the resultant was subjected to potentiometric titration with 0.1 mol/L perchloric acid-acetic acid, and the concentration of the epoxy groups was calculated according to the following equation.

The concentration of the epoxy groups [eq/g]=(the amount of 0.1 mol/L perchloric acid-acetic acid [ml] required for the titration of the solution obtained by dissolving the component (B) in chloroform and then by adding acetic acid and a solution of triethylammonium bromide in acetic acid to the resultant−the amount of 0.1 mol/L perchloric acid-acetic acid [ml] required for the titration of a solution obtained by adding only acetic acid and a solution of triethylammonium bromide in acetic acid to chloroform)× the concentration of 0.1 mol/L perchloric acid-acetic acid [mol/ml]×1/the amount of the component (B) [g] used in the titration).

The blending amount of the epoxy groups derived from the component (B) in the thermoplastic polyester resin composition was calculated, according to the following equation, from the concentration of the epoxy groups in the component (B) calculated based on the result of the above-mentioned potentiometric titration, and from the blending amount of the component (B) in the thermoplastic polyester resin composition.

The blending amount of the epoxy groups derived from the (B) [eq/g] in the thermoplastic polyester resin composition=(the concentration [eq/g] of the epoxy groups in the component (B)×the blending amount of the component (B) [parts by weight])/the total amount of the thermoplastic polyester resin composition [parts by weight].

3. Mechanical Properties (Tensile Strength and Tensile Elongation)

Using an injection molding machine, IS55EPN, manufactured by Toshiba Machine Co., Ltd., under a mold temperature of 80° C. and under the molding cycle conditions consisting of a 10-second period of injection and pressure dwelling in total, and a 10-second period of cooling, ASTM No. 1 dumbbell-shaped test specimens for evaluating the tensile properties, having a test specimen thickness of ⅛ inch (about 3.2 mm) were prepared. When a polybutylene terephthalate resin was used as the component (A), the molding was performed under three conditions of a molding temperature of 250° C., 270° C. and 290° C. When a polyethylene terephthalate resin was used as the component (A), the molding was performed under two conditions of a molding temperature of 270° C. and 290° C. The maximum tensile strength point (tensile strength) and the maximum tensile elongation point (tensile elongation) of the resulting test specimens for evaluating the tensile properties were measured, according to ASTM D638 (2005). The mean of the measured values of the three test specimens was taken. Materials with higher values of the tensile strength are evaluated to have better mechanical strength, and materials with higher values of the tensile elongation are evaluated to have better toughness.

4. Heat Resistance (Heat Distortion Temperature)

When a polybutylene terephthalate resin was used as the component (A), test specimens for evaluating the heat distortion temperature having a thickness of ⅛ inch (about 3.2 mm), a length of 127 mm and a width of 13 mm were prepared, using an injection molding machine, IS55EPN, manufactured by Toshiba Machine Co., Ltd., under the same injection molding conditions as described for the preparation of the test specimens for evaluating the tensile properties in the section 3 with the molding temperature of 250° C. When a polyethylene terephthalate resin was used as the component (A), the molding was performed under the condition of a molding temperature of 270° C. The heat distortion temperature of the resulting test specimens for evaluating the heat distortion temperature was measured, under the conditions of a measurement load of 1.82 MPa, according to ASTM D648 (2005). The mean of the measured values of the three test specimens was taken as the value of the heat distortion temperature. Materials having a heat distortion temperature of less than 50° C. were evaluated to have a poor heat resistance, and we determined that the higher the value of the heat distortion temperature, the better the heat resistance of the material.

5. Long-Term Hydrolysis Resistance (Tensile Strength Retention)

ASTM No. 1 dumbbell-shaped test specimens for evaluating the tensile properties having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in the section 3. The resulting ASTM No. 1 dumbbell-shaped specimens were placed in a highly accelerated stress test chamber, EHS-411 manufactured by ESPEC Corp., controlled at a temperature of 121° C. and a humidity of 100% RH, and subjected to heat-moisture treatment for 96 hours (four days). The maximum tensile strength point of the molded articles after the heat-moisture treatment was measured under the same conditions as the tensile test described in the section 3, and the mean of the measured values of the three test specimens was obtained. The tensile strength retention was calculated according to the following equation, from the maximum tensile strength point of the test specimens after the heat-moisture treatment, and from the maximum tensile strength point of the test specimens without the heat-moisture treatment.

Tensile strength retention (%)=(maximum tensile strength point after heat-moisture treatment÷maximum tensile strength point before heat-moisture treatment)×100

Materials having a tensile strength retention of less than 50% were evaluated to have a poor hydrolysis resistance, and we determined that the higher the value of the tensile strength retention, the better the hydrolysis resistance.

6. Retention Stability (Rate of Change in Melt Viscosity Index)

The melt viscosity index (melt flow index) of the thermoplastic polyester resin composition was measured, using C501DOS manufactured by Toyo Seiki Co., Ltd., under the conditions of a temperature of 270° C. and a load of 325 g, in accordance with ASTM D1238 (1999).

Further, after retaining the thermoplastic polyester resin composition in a cylinder for 30 minutes, the melt viscosity index was measured under the same conditions, and the rate of change (%) of the melt viscosity index was obtained by the following equation.

Rate of change of the melt viscosity index (%)= ((melt viscosity index after the retention for 30 minutes)–(melt viscosity index before the retention))÷(melt viscosity index before the retention)×100

The rate of change (%) calculated herein is an absolute value and was calculated as a positive value. When the rate of change in melt viscosity index is greater than 50%, the resin composition was evaluated to have a poor retention stability, and we determined that the smaller the difference, the better the retention stability.

7. Color (Degree of Yellowing (YI Value))

When a polybutylene terephthalate resin was used as the component (A), ASTM No. 1 dumbbell-shaped test specimens for evaluating the color having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in the section 3 with the molding temperature of 250° C. When a polyethylene terephthalate resin was used as the component (A), the molding was performed under the condition of a molding temperature of 270° C. The resulting ASTM No. 1 dumbbell-shaped specimens were measured for the color using a spectrophotometer SE2000 manufactured by Nippon Denshoku Industries Co., Ltd., and the degree of yellowing (YI value) was calculated. Materials having a degree of yellowing (YI value) of greater than 30 were evaluated to have a poor color, and we determined that the lower the degree of yellowing (YI value), the better the color.

8. Concentration of Carboxyl Groups (Concentration of Carboxyl Groups in Resin Composition)

In the thermoplastic polyester resin composition, the total concentration of the carboxyl groups derived from the thermoplastic polyester resin (A) and of the carboxyl groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B) was calculated based on the composition ratio of each component in the composition after the concentration of the carboxyl groups in the composition was calculated by dissolving 2 g of the resin composition in 50 mL of a mixed solution of o-cresol/chloroform (2/1, vol/vol) to prepare a solution; and titrating the solution with 0.05 mol/L ethanolic potassium hydroxide, using 1% bromophenol blue as an indicator.

9. Concentration of Epoxy Groups

In the thermoplastic polyester composition, the total concentration of the epoxy groups derived from the epoxy compound (B) and of the epoxy groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B) was calculated based on the composition of each component in the composition after the concentration of the epoxy groups in the composition was calculated by dissolving 2 g of the thermoplastic polyester resin composition in 30 mL of a mixed solution of o-cresol/chloroform (2/1, vol/vol) to prepare a solution; adding thereto 20 mL of acetic acid and 10 mL of a 20 wt % solution of triethylammonium bromide in acetic acid; and then subjecting the resulting solution to potentiometric titration with 0.1 mol/L perchloric acid-acetic acid.

10. Bleed-Out

When a polybutylene terephthalate resin was used as the component (A), ASTM No. 1 dumbbell-shaped test specimens for evaluating the bleed-out having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in the section 3 with the molding temperature of 250° C. When a polyethylene terephthalate resin was used as the component (A), the molding was performed under the condition of a molding temperature of 270° C. The thus obtained ASTM No. 1 dumbbell-shaped specimens were placed in a highly accelerated stress test chamber EHS-411 manufactured by ESPEC Corp., controlled at a temperature of 121° C. and a humidity of 100% RH, and subjected to heat-moisture treatment for 96 hours (four days). The appearance of the molded articles after the heat-moisture treatment was visually observed, and the evaluation of bleed-out was performed according to the following standards.

A: No bleed-out of liquid or white powder is observed on the molded article.
B: Bleed-out of liquid or white powder is observed in some or many portions of the molded article.

Examples 1 to 26 and Comparative Examples 1 to 6

A co-rotating twin-screw extruder equipped with a vent (TEX-30α, manufactured by The Japan Steel Works, Ltd.)

with a screw diameter of 30 mm and a L/D of 35 was used. In each of the Examples and Comparative Examples, the thermoplastic polyester resin (A), the epoxy compound (B), the hindered amine compound (C), and the reaction accelerator (D) and materials as required were mixed according to the compositions shown in Tables 1 to 4, and the resulting mixture was fed to the twin-screw extruder through its feeding portion. The fiber reinforcement (E) was fed through a side feeder installed between the feeding portion and the vent portion. Melt blending was performed under the extrusion conditions of a kneading temperature of 260° C. and a screw rotational speed of 150 rpm. The resulting resin composition was extruded in the form of strands and passed through a cooling bath for solidification, and the resulting strands were then cut into pellets using a strand cutter.

The resulting pellets were dried in a hot air dryer controlled at a temperature of 110° C. for 6 hours. After the drying, the dried pellets were evaluated according to the above-mentioned methods. The results are shown in Tables 1 to 4. The total concentration of the carboxyl groups derived from the thermoplastic polyester resin (A) and of the carboxyl groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B) in the thermoplastic polyester resin composition is described in the Tables as "Concentration of carboxyl groups in the resin composition". Further, the total concentration of the epoxy groups derived from the epoxy compound (B) and of the epoxy groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B) in the thermoplastic polyester resin composition is described in the Tables as "Concentration of epoxy groups in the resin composition".

TABLE 1

| | | | | Examples | | | | | | | | |
|---|---|---|---|---|---|---|---|---|---|---|---|---|
| | Code | Unit | 1 | 2 | 3 | 4 | 5 | 6 | 7 | 8 | 9 |
| (A) Thermoplastic polyester resin having an amount of carboxyl groups of 30 eq/t | A-1 | Parts by weight | 100 | 100 | 100 | 100 | 100 | 100 | 100 | 100 | 100 |
| (B) Glycidyl ester compound with an epoxy equivalent of 147 g/eq | B-1 | Parts by weight | 0.7 | | | | | | | | |
| (B) Glycidyl ether compound with an epoxy equivalent of 190 g/eq | B-2 | Parts by weight | | 0.9 | | | | 0.1 | | | |
| (B) Glycidyl ether compound with an epoxy equivalent of 211 g/eq | B-3 | Parts by weight | | | 1.0 | | | | | | |
| (B) Glycidyl ether compound with an epoxy equivalent of 253 g/eq | B-4 | Parts by weight | | | | 1.2 | 1.1 | | | | |
| (B) Glycidyl ether compound with an epoxy equivalent of 290 g/eq | B-5 | Parts by weight | | | | | | | 1.4 | | |
| (B) Epoxidized fatty acid ester compound with an epoxy equivalent of 232 g/eq | B-6 | Parts by weight | | | | | | | | 1.1 | |
| (B) Glycidyl imide compound with an epoxy equivalent of 109 g/eq | B-7 | Parts by weight | | | | | | | | 0.5 | |
| (B) Alicyclic epoxy compound with an epoxy equivalent of 135 g/eq | B-8 | Parts by weight | | | | | | | | | 0.7 |
| (C) Hindered amine compound | C-1 | Parts by weight | 0.1 | 0.1 | 0.1 | 0.1 | 0.1 | 0.1 | 0.1 | 0.1 | 0.1 |
| Blending amount of epoxy groups derived from (B)/Blending amount of carboxyl groups derived from (A) | — | | 1.6 | 1.6 | 1.6 | 1.6 | 1.6 | 1.6 | 1.6 | 1.6 | 1.6 |
| Properties upon molding at 250° C. | Mechanical properties (tensile strength) | MPa | 60 | 60 | 60 | 61 | 61 | 61 | 60 | 60 | 60 |
| | Mechanical properties (tensile elongation) | % | 5.3 | 5.5 | 5.6 | 5.7 | 5.6 | 5.7 | 5.3 | 5.4 | 5.2 |
| | Long-term hydrolysis resistance (tensile strength retention), treatment for 96 hours | % | 62 | 73 | 78 | 83 | 85 | 80 | 75 | 61 | 72 |
| Properties upon molding at 270° C. | Mechanical properties (tensile strength) | MPa | 60 | 60 | 60 | 60 | 60 | 60 | 60 | 60 | 60 |
| | Long-term hydrolysis resistance (tensile strength retention), treatment for 96 hours | % | 57 | 68 | 73 | 78 | 81 | 75 | 70 | 56 | 67 |
| Properties upon molding at 290° C. | Mechanical properties (tensile strength) | MPa | 60 | 60 | 60 | 60 | 60 | 60 | 60 | 60 | 60 |
| | Long-term hydrolysis resistance (tensile strength retention), treatment for 96 hours | % | 52 | 63 | 68 | 73 | 77 | 70 | 65 | 51 | 62 |
| Retention stability (rate of change in melt viscosity index), 270° C. | | % | 45 | 12 | 19 | 8 | 4 | 12 | 17 | 43 | 21 |
| Heat resistance (heat distortion temperature) | | ° C. | 56 | 58 | 60 | 61 | 61 | 61 | 55 | 56 | 55 |
| Color (degree of yellowing (YI value)) | | — | 13 | 14 | 21 | 22 | 22 | 23 | 18 | 16 | 15 |

TABLE 1-continued

|  | Code | Unit | Examples 1 | 2 | 3 | 4 | 5 | 6 | 7 | 8 | 9 |
|---|---|---|---|---|---|---|---|---|---|---|---|
| Concentration of carboxyl groups in resin composition |  | eq/t | 6 | 6 | 6 | 6 | 6 | 6 | 7 | 6 | 6 |
| Concentration of epoxy groups in resin composition |  | eq/t | 12 | 19 | 23 | 23 | 22 | 24 | 24 | 19 | 8 |
| Bleed-out |  | Visual observation | A | A | A | A | A | A | A | A | A |

TABLE 2

|  |  | Code | Unit | Examples 10 | 11 | 12 | 13 | 14 | 15 | 16 | 17 | 18 |
|---|---|---|---|---|---|---|---|---|---|---|---|---|
| (A) Thermoplastic polyester resin having an amount of carboxyl groups of 30 eq/t |  | A-1 | Parts by weight | 100 | 100 | 100 | 100 | 100 | 100 | 100 | 100 | 100 |
| (B) Glycidyl ether compound with an epoxy equivalent of 211 g/eq |  | B-3 | Parts by weight | 0.5 | 1 | 3 | 5 | 10 | 1 | 1 | 1 | 1 |
| (C) Hindered amine compound |  | C-1 | Parts by weight |  |  |  |  |  |  |  |  |  |
| (C) Hindered amine compound |  | C-2 | Parts by weight | 0.1 | 0.1 | 0.1 | 0.1 | 0.1 | 0.03 | 0.05 | 0.4 | 0.8 |
| (C) Hindered amine compound |  | C-3 | Parts by weight |  |  |  |  |  |  |  |  |  |
| (C) Hindered amine compound |  | C-4 | Parts by weight |  |  |  |  |  |  |  |  |  |
| Blending amount of epoxy groups derived from (B)/Blending amount of carboxyl groups derived from (A) |  | — |  | 0.8 | 1.6 | 4.8 | 7.9 | 16 | 1.6 | 1.6 | 1.6 | 1.6 |
| Properties upon molding at 250° C. | Mechanical properties (tensile strength) |  | MPa | 61 | 60 | 60 | 60 | 57 | 60 | 60 | 60 | 60 |
|  | Mechanical properties (tensile elongation) |  | % | 5.7 | 5.6 | 5.4 | 4.9 | 4.3 | 5.6 | 5.6 | 5.5 | 5.4 |
|  | Long-term hydrolysis resistance (tensile strength retention), treatment for 96 hours |  | % | 77 | 85 | 90 | 94 | 92 | 65 | 80 | 81 | 82 |
| Properties upon molding at 270° C. | Mechanical properties (tensile strength) |  | MPa | 60 | 60 | 60 | 60 | 57 | 60 | 60 | 60 | 60 |
|  | Long-term hydrolysis resistance (tensile strength retention), treatment for 96 hours |  | % | 75 | 81 | 85 | 90 | 86 | 62 | 76 | 78 | 77 |
| Properties upon molding at 290° C. | Mechanical properties (tensile strength) |  | MPa | 58 | 60 | 60 | 60 | 55 | 59 | 60 | 60 | 60 |
|  | Long-term hydrolysis resistance (tensile strength retention), treatment for 96 hours |  | % | 65 | 78 | 82 | 83 | 80 | 51 | 59 | 73 | 72 |
| Retention stability (rate of change in melt viscosity index), 270° C. |  |  | % | 41 | 15 | 18 | 22 | 49 | 41 | 22 | 33 | 45 |
| Heat resistance (heat distortion temperature) |  |  | ° C. | 59 | 60 | 60 | 58 | 54 | 59 | 59 | 59 | 59 |
| Color (degree of yellowing (YI value)) |  |  | — | 17 | 21 | 23 | 25 | 30 | 22 | 21 | 24 | 28 |
| Concentration of carboxyl groups in resin composition |  |  | eq/t | 10 | 5 | 4 | 4 | 3 | 10 | 8 | 4 | 3 |
| Concentration of epoxy groups in resin composition |  |  | eq/t | 4 | 22 | 116 | 211 | 447 | 27 | 25 | 21 | 20 |
| Bleed-out |  |  | Visual observation | A | A | A | A | A | A | A | A | A |

TABLE 3

|  | Code | Unit | Examples 19 | 20 | 21 | 22 | 23 | 24 | 25 | 26 | 27 |
|---|---|---|---|---|---|---|---|---|---|---|---|
| (A) Thermoplastic polyester resin having an amount of carboxyl groups of 30 eq/t | A-1 | Parts by weight | 100 | 100 |  | 100 | 100 | 100 | 100 | 100 | 100 |
| (A) Thermoplastic polyester resin having an amount of carboxyl groups of 40 eq/t | A-2 | Parts by weight |  |  | 100 |  |  |  |  |  |  |
| (B) Glycidyl ether compound with an epoxy equivalent of 211 g/eq | B-3 | Parts by weight | 1 | 1 | 1.4 | 1 | 1 | 1 | 1 | 1 | 1 |
| (C) Hindered amine compound | C-1 | Parts by weight |  |  |  |  |  |  |  |  |  |

TABLE 3-continued

|  | Code | Unit | Examples 19 | 20 | 21 | 22 | 23 | 24 | 25 | 26 | 27 |
|---|---|---|---|---|---|---|---|---|---|---|---|
| (C) Hindered amine compound | C-2 | Parts by weight |  |  | 0.1 | 0.1 | 0.1 | 0.1 | 0.1 | 0.1 | 0.1 |
| (C) Hindered amine compound | C-3 | Parts by weight | 0.1 |  |  |  |  |  |  |  |  |
| (C) Hindered amine compound | C-4 | Parts by weight |  | 0.1 |  |  |  |  |  |  |  |
| (D) Reaction accelerator | D-1 | Parts by weight |  |  |  |  | 0.05 |  |  |  |  |
| (D) Reaction accelerator | D-2 | Parts by weight |  |  |  |  |  | 0.05 |  |  |  |
| (D) Reaction accelerator | D-3 | Parts by weight |  |  |  |  |  |  | 0.05 |  |  |
| (E) Fiber reinforcement | E-1 | Parts by weight |  |  |  |  |  |  |  | 40 |  |
| (E) Fiber reinforcement | E-2 | Parts by weight |  |  |  |  |  |  |  |  | 40 |
| (F) Phosphorus-based stabilizer | F-1 | Parts by weight |  |  |  |  |  |  |  |  | 0.1 |
| Blending amount of epoxy groups derived from (B)/Blending amount of carboxyl groups derived from (A) | — |  | 1.6 | 1.6 | 1.6 | 1.6 | 1.6 | 1.6 | 1.6 | 1.6 | 1.6 |
| Properties upon molding at 250° C. | Mechanical properties (tensile strength) | MPa | 60 | 60 | — | 60 | 60 | 60 | 152 | 153 | 60 |
|  | Mechanical properties (tensile elongation) | % | 5.6 | 5.4 | — | 5.5 | 5.4 | 5.4 | 3.5 | 3.4 | 5.4 |
|  | Long-term hydrolysis resistance (tensile strength retention), treatment for 96 hours | % | 85 | 84 | — | 100 | 100 | 100 | 88 | 95 | 84 |
| Properties upon molding at 270° C. | Mechanical properties (tensile strength) | MPa | 60 | 60 | 54 | 60 | 60 | 60 | 150 | 151 | 60 |
|  | Long-term hydrolysis resistance (tensile strength retention), treatment for 96 hours | % | 82 | 80 | 60 | 100 | 100 | 100 | 84 | 90 | 82 |
| Properties upon molding at 290° C. | Mechanical properties (tensile strength) | MPa | 60 | 60 | 55 | 60 | 60 | 60 | 150 | 151 | 60 |
|  | Long-term hydrolysis resistance (tensile strength retention), treatment for 96 hours | % | 79 | 77 | 53 | 95 | 100 | 100 | 80 | 84 | 80 |
| Retention stability (rate of change in melt viscosity index), 270° C. |  | % | 13 | 15 | 19 | 5 | 3 | 2 | 23 | 10 | 5 |
| Heat resistance (heat distortion temperature) |  | ° C. | 60 | 59 | 65 | 60 | 60 | 60 | 210 | 210 | 59 |
| Color (degree of yellowing (YI value)) |  | — | 21 | 23 | 18 | 28 | 29 | 19 | 21 | 22 | 18 |
| Concentration of carboxyl groups in resin composition |  | eq/t | 5 | 4 | 9 | 2 | 2 | 1 | 4 | 4 | 4 |
| Concentration of epoxy groups in resin composition |  | eq/t | 22 | 21 | 35 | 9 | 9 | 8 | 11 | 11 | 21 |
| Bleed-out |  | Visual observation | A | A | A | A | A | A | A | A | A |

TABLE 4

|  | Code | Unit | Comparative Examples 1 | 2 | 3 | 4 | 5 | 6 | 7 | 8 |
|---|---|---|---|---|---|---|---|---|---|---|
| (A) Thermoplastic polyester resin having an amount of carboxyl groups of 30 eq/t | A-1 | Parts by weight |  | 100 | 100 |  |  | 100 | 100 | 100 |
| (A) Thermoplastic polyester resin having an amount of carboxyl groups of 40 eq/t | A-2 | Parts by weight |  |  |  | 100 | 100 |  |  |  |
| (A) Thermoplastic polyester resin having an amount of carboxyl groups of 55 eq/t | A'-3 | Parts by weight | 100 |  |  |  |  |  |  |  |
| (B) Glycidyl ether compound with an epoxy equivalent of 211 g/eq | B-3 | Parts by weight | 1.9 | 1 |  | 1.4 |  | 1 | 15 | 1 |
| (C) Hindered amine compound | C-1 | Parts by weight |  |  |  |  |  |  |  |  |
| (C) Hindered amine compound | C-2 | Parts by weight | 0.1 |  | 0.1 |  | 0.1 |  | 0.1 | 1.2 |
| (D) Reaction accelerator | D-1 | Parts by weight |  |  |  |  |  | 0.05 |  |  |

TABLE 4-continued

|  | Code | Unit | Comparative Examples | | | | | | | |
|---|---|---|---|---|---|---|---|---|---|---|
|  |  |  | 1 | 2 | 3 | 4 | 5 | 6 | 7 | 8 |
| Blending amount of epoxy groups derived from (B)/Blending amount of carboxyl groups derived from (A) |  | — | 1.6 | 1.6 | — | 1.6 | — | 1.6 | 23 | 1.6 |
| Properties upon molding at 250° C. | Mechanical properties (tensile strength) | MPa | 46 | 59 | 58 | — | — | 60 | 55 | 60 |
|  | Mechanical properties (tensile elongation) | % | 8.7 | 5.6 | 5.9 | — | — | 5.2 | 2.8 | 5.1 |
|  | Long-term hydrolysis resistance (tensile strength retention), treatment for 96 hours | % | 21 | 35 | 33 | — | — | 90 | 85 | 83 |
| Properties upon molding at 270° C. | Mechanical properties (tensile strength) | MPa | 40 | 51 | 48 | 51 | 52 | 56 | 55 | 60 |
|  | Long-term hydrolysis resistance (tensile strength retention), treatment for 96 hours | % | 10 | 21 | 12 | 12 | 2 | 43 | 83 | 78 |
| Properties upon molding at 290° C. | Mechanical properties (tensile strength) | MPa | 25 | 40 | 43 | 50 | 51 | 52 | 55 | 60 |
|  | Long-term hydrolysis resistance (tensile strength retention), treatment for 96 hours | % | 5 | 8 | 1 | 0 | 0 | 21 | 82 | 72 |
| Retention stability (rate of change in melt viscosity index), 270° C. |  | % | 167 | 47 | 180 | 45 | 120 | 67 | 130 | 80 |
| Heat resistance (heat distortion temperature) |  | ° C. | 47 | 58 | 59 | 67 | 69 | 58 | 49 | 56 |
| Color (degree of yellowing (YI value)) |  | — | 25 | 22 | 12 | 22 | 10 | 17 | 38 | 31 |
| Concentration of carboxyl groups in resin composition |  | eq/t | 25 | 13 | 32 | 29 | 42 | 4 | 1 | 5 |
| Concentration of epoxy groups in resin composition |  | eq/t | 55 | 26 | — | 61 | — | 18 | 679 | 19 |
| Bleed-out |  | Visual observation | A | A | A | A | A | A | B | B |

A comparison of Examples 1 to 21 with Comparative Examples 1 to 8 showed that, when the blending amount of the component (B) and the blending amount of the component (C) with respect to 100 parts by weight of the thermoplastic polyester resin (A) having an amount of the carboxyl groups of 50 eq/t or less is within a specific range, materials having excellent mechanical properties, hydrolysis resistance, heat resistance, retention stability at 270° C., and excellent properties at the time of molding at a high temperature can be obtained.

A comparison of Examples 2 to 7 and 9 with Examples 1 and 8 showed that, when a glycidyl ether compound, an epoxidized fatty acid ester compound and an alicyclic epoxy compound are used as the epoxy compound (B), materials which show improved hydrolysis resistance and improved properties at the time of molding at a high temperature can be obtained.

A comparison of Examples 11, 19 and 20 with Example 3 showed that, when an NH type hindered amine is used as the hindered amine compound (C), materials which show improved hydrolysis resistance and improved properties at the time of molding at a high temperature can be obtained.

As can be seen from the comparison of Examples 22, 23, and 24 with Example 11, materials having improved mechanical properties, long-term hydrolysis resistance, retention stability at 270° C., and improved properties at the time of molding at a high temperature can be obtained when 0.001 to 1 part by weight of the reaction accelerator (D) was included.

As can be seen from the comparison of Examples 25 and 26 with Example 11, materials having improved mechanical properties and heat resistance, long-term hydrolysis resistance, retention stability at 270° C., and improved properties at the time of molding at a high temperature can be obtained when 1 to 100 parts by weight of the fiber reinforcement (E) was included.

As can be seen from the comparison of Examples 11 and 21 with Comparative Example 1, when a polybutylene terephthalate resin is used as the component (A), materials having improved mechanical strength and long-term hydrolysis resistance can be obtained as compared to when other polyester resins are used.

The invention claimed is:

1. A thermoplastic polyester resin composition comprising 0.05 to 10 parts by weight of an epoxy compound (B) and 0.001 to 1 part by weight of a hindered amine compound (C) with respect to 100 parts by weight of a thermoplastic polyester resin (A) having an amount of carboxyl groups of 50 eq/t or less and a ratio of an amount of epoxy groups derived from the epoxy compound (B) to an amount of carboxyl groups derived from the thermoplastic polyester resin (A) is 0.5 to 4.8, wherein the epoxy compound (B) is a combination of a novolac epoxy and a condensate of bisphenol A and epichlorohydrin, the thermoplastic polyester resin (A) is a polybutylene terephthalate resin, wherein when ASTM No. 1 dumbbell-shaped test specimens having a test specimen thickness of ⅛ inch were prepared under a molding temperature of 270° C. from the thermoplastic polyester resin composition and tensile strength of the test specimens are measured according to ASTM D638 (2005) before and after being placed in a highly accelerated stress test chamber controlled at a temperature of 121° C. and a humidity of 100% RH and subjected to heat-moisture treatment for 96 hours, a tensile strength retention calculated according to the following equation is 80% or more; and wherein the tensile strength retention is calculated according to the following equation:

Tensile strength retention (%)=(maximum tensile strength point after heat-moisture treatment÷maximum tensile strength point before heat-moisture treatment)×100.

2. The thermoplastic polyester resin composition according to claim 1, wherein a total concentration of the carboxyl groups derived from the thermoplastic polyester resin (A) and of carboxyl groups derived from a reaction product of the thermoplastic polyester resin (A) and the epoxy compound (B) with respect to the total amount of the thermoplastic polyester resin (A), the epoxy compound (B) and a reaction product of the thermoplastic polyester resin (A) and the epoxy compound (B) is 20 eq/t or less.

3. The thermoplastic polyester resin composition according to claim 1, wherein the epoxy compound (B) is at least one selected from a glycidyl ether compound, an epoxidized fatty acid ester compound, and an alicyclic epoxy compound.

4. The thermoplastic polyester resin composition according to claim 1, wherein the hindered amine compound (C) is a hindered amine having a structure represented by general formula (1)

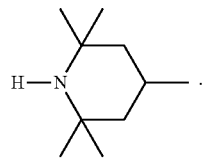
(1)

5. The thermoplastic polyester resin composition according to claim 1, further comprising a reaction accelerator (D) other than the hindered amine compound (C) in an amount of 0.001 to 1.0 part by weight with respect to 100 parts by weight of the thermoplastic polyester resin (A).

6. The thermoplastic polyester resin composition according to claim 1, further comprising a fiber reinforcement (E) in an amount of 1 to 100 parts by weight with respect to 100 parts by weight of the thermoplastic polyester resin (A).

7. The thermoplastic polyester resin composition according to claim 1, wherein the thermoplastic polyester resin (A) is a polybutylene terephthalate resin.

8. A molded article composed of the thermoplastic polyester resin composition according to claim 1.

9. A method of producing a molded article comprising melt-molding the thermoplastic polyester resin composition according to claim 1.

10. The thermoplastic polyester resin composition according to claim 1, wherein, when ASTM No. 1 dumbbell-shaped test specimens having a test specimen thickness of ⅛ inch were prepared under a molding temperature of 270° C. from the thermoplastic polyester resin composition and tensile strength of the test specimens are measured according to ASTM D638 (2005), the tensile strength is 54 MPa-151 MPa.

* * * * *